(12) United States Patent
Irmer et al.

(10) Patent No.: US 8,076,574 B2
(45) Date of Patent: Dec. 13, 2011

(54) DISTRIBUTION CABINET WITH A PLURALITY OF INNER BODIES

(75) Inventors: Günter Irmer, Berlin (DE); Helmut Perschon, Berlin (DE)

(73) Assignees: ADC GmbH, Berlin (DE); Berthold Sichert GmbH, Berlin (DE)

( * ) Notice: Subject to any disclaimer, the term of this patent is extended or adjusted under 35 U.S.C. 154(b) by 590 days.

(21) Appl. No.: 12/047,847

(22) Filed: Mar. 13, 2008

(65) Prior Publication Data

US 2008/0224578 A1 Sep. 18, 2008

(30) Foreign Application Priority Data

Mar. 13, 2007 (DE) .......................... 10 2007 012 079

(51) Int. Cl.
*H05K 5/00* (2006.01)
*A47B 53/02* (2006.01)

(52) U.S. Cl. ......... 174/50; 174/521; 174/17 R; 361/724; 361/730; 361/752; 361/641; 312/223.1; 312/107; 312/198

(58) Field of Classification Search .................... 174/50, 174/53, 57, 58, 521, 17 R; 220/3.2–3.9, 220/4.02; 361/600, 601, 608, 641, 605, 831, 361/614, 616, 679.01, 724, 730, 726, 752, 361/796; 312/107, 198, 223.1, 223.2, 265.3, 312/265.4, 108, 352, 326, 351.1; 248/678
See application file for complete search history.

(56) References Cited

U.S. PATENT DOCUMENTS

| | | | |
|---|---|---|---|
| 5,747,734 A | | 5/1998 | Kozlowski et al. |
| 6,062,665 A | * | 5/2000 | Schneider et al. ......... 312/223.1 |
| 6,095,482 A | * | 8/2000 | LaGrotta et al. ............. 248/678 |
| 6,615,998 B2 | | 9/2003 | Klassen et al. |
| 6,657,861 B2 | * | 12/2003 | Irmer ........................ 312/223.1 |
| 6,788,535 B2 | * | 9/2004 | Dodgen et al. ................ 361/831 |
| 6,791,027 B1 | * | 9/2004 | Nicolai et al. .................. 174/50 |
| 6,932,443 B1 | * | 8/2005 | Kaplan et al. .............. 312/223.1 |
| 6,945,616 B2 | * | 9/2005 | Webster et al. ............ 312/265.3 |
| 7,492,575 B2 | * | 2/2009 | Irmer et al. ................... 361/608 |
| 7,496,269 B1 | | 2/2009 | Lee |

(Continued)

FOREIGN PATENT DOCUMENTS

AU 736804 6/1998

(Continued)

OTHER PUBLICATIONS

International Search Report from PCT/EP2008/002415 dated Sep. 17, 2008.

(Continued)

*Primary Examiner* — Angel R Estrada
(74) *Attorney, Agent, or Firm* — Merchant & Gould P.C.

(57) ABSTRACT

The invention relates to a distribution cabinet (1) having a body (3), comprising an inner body (21) in the form of a body frame (16) made from metal and possibly paneling with shielding plates (13), and an outer body (22), in particular in the form of spaced paneling of the inner body (21), which is preferably made from plastic, and a mounting rack (6) for fixing the internals, which mounting rack is fixed on the inner body (21), the body (3) comprises a plurality of inner bodies (21) next to one another, and at least one attachment element (12) is fixed thereto which allows the use of parts of the outer body (22) of an individual distribution cabinet (1), and to a construction kit and a method for extending a distribution cabinet.

35 Claims, 10 Drawing Sheets

U.S. PATENT DOCUMENTS

| | | |
|---|---|---|
| 7,728,225 B2 * | 6/2010 | Anderson et al. ............... 174/50 |
| 2002/0140325 A1 | 10/2002 | Webster et al. |
| 2006/0220506 A1 | 10/2006 | Irmer et al. |
| 2010/0102691 A1 | 4/2010 | Perschon et al. |

FOREIGN PATENT DOCUMENTS

| | | |
|---|---|---|
| AU | 199744327 B2 | 8/2001 |
| AU | 2002247632 B2 | 11/2006 |
| DE | 196 54 594 | 7/1998 |
| DE | 201 01 558 | 4/2001 |
| DE | 101 05 993 | 9/2002 |
| DE | 103 07 944 | 9/2004 |
| DE | 103 10 778 | 9/2004 |
| DE | 10 2004 033 976 | 2/2006 |
| EP | 0 849 850 | 6/1998 |
| EP | 0 872 930 | 10/1998 |
| EP | 1 365 491 | 11/2003 |
| EP | 1458073 A2 | 3/2004 |
| WO | 02/075883 | 9/2002 |
| WO | WO 2008110391 A2 | 9/2008 |
| WO | 2010/051925 | 5/2010 |

OTHER PUBLICATIONS

Irmer et al. U.S. Appl. No. 29/305,093, filed Mar. 13, 2008.

U.S. Appl. No. 12/921,040, filed Nov. 30, 2010 to Perschon et al.

* cited by examiner

DISTRIBUTION CABINET WITH A PLURALITY OF INNER BODIES

I. APPLICATION AREA

The invention relates to a distribution cabinet, which is generally installed outdoors and accommodates the technical, for example electrical or optical, distribution systems for, for example, weak-current systems, for example telephone systems, with associated power supply devices and cable terminating/connection devices for a specific physical area.

II. TECHNICAL BACKGROUND

Such distribution cabinets, in addition to having sufficient physical stability and sufficient IP security, i.e. imperviousness to rain and spraywater, and an ability to resist vandalism etc., need to meet further requirements today, for example should not emit excessive electromagnetic radiation to the surrounding environment and, for use primarily in warmer countries, the temperatures in the interior of the distribution cabinet should not rise too high despite the heat-emitting electrical assemblies accommodated there, but should also not sink too low.

A further problem in addition to the repair work is that of the lateral extension of distribution cabinets which should firstly make it possible to laterally connect the two distribution cabinets fixedly and such that they are aligned and should secondly take place as quickly as possible, as is also the case for repair work.

Therefore, if possible the construction of a base beneath the body to be attached should preferably be dispensed with.

III. SUMMARY

It is therefore the object to design the distribution cabinet and in particular its body in such a way that subsequent work such as cabinet extensions is possible as quickly as possible and, if possible, without deactivating the distribution cabinet.

In a distribution cabinet which is constructed from the components of the generic type and in which a plurality of inner bodies are provided next to one another in order to provide a modular, larger cabinet, the elements of an outer body which have been used to date can be used on each of the inner bodies in accordance with the previous methods, which is one of the tasks of the attachment element.

This is because the outer body comprises outer paneling, generally spaced paneling which is fixed to the inner body, and is made from plastic injection-molded parts, i.e. involves a high degree of preliminary complexity for producing the shapes so that the provision of additional paneling elements whose dimensions have been modified would be very disadvantageous in financial terms.

The attachment element should therefore ensure that, in the case of mutually attached inner bodies, the same parts of the outer body can be used for the outer paneling of such an attachment cabinet as are also used as outer body of an individual distribution cabinet, i.e. of a distribution cabinet with only one inner body, and are available in standard sizes offered by the manufacturer.

In general, the outer body which is made of plastic is constructed in such a way that, when viewed in the plan view, the side walls are usually fixed to the inner body via spacers and the side walls have connecting elements, for example at a distance one above the other, at their vertical front and rear edges, which connecting elements interact with analogous hinge tabs on the fixedly mounted rear wall and the front faces in the form of doors, which are plugged together as a toothed arrangement and are connected by means of a vertically running hinge rod which has been pushed through as the spindle. While this hinge formation is in fact used as the hinge in the doors, i.e. for swinging open the doors and therefore opening the front side, it is used on the rear side merely for fixing the rear wall.

Since two distribution cabinets which have been attached to one another by means of their inner bodies are intended not to have any such side walls of the outer body on the mutually facing sides, but in contrast the inner free space in the inner bodies is intended to be free from one inner body through to the other, the fixing elements for the rear walls and doors which would otherwise be made available by these side walls are lacking here. Instead, these fixing elements are formed by the additional attachment element, usually a strip-shaped element, of which one is provided for the front vertical joint and one for the rear vertical joint, which is present between the two inner bodies. Instead of the two strip-shaped elements, the additional attachment element may also be in the form of a peripheral, closed frame in a vertical plane.

Each of the attachment elements in this case has two sets, next to one another (when viewed from the front or rear) of fixing apparatuses, namely on the front side for accommodating the right-hand door of the left-hand distribution cabinet and the left-hand door of the right-hand distribution cabinet and on the rear side for accommodating the vertical edges, facing the joint, of the two rear walls.

In a first embodiment, the attachment element is at the same time the spacer between the two inner bodies and brings the two inner bodies to a defined distance from one another which would approximately correspond to the distance between the inner bodies if two individual distribution cabinets which are paneled completely on the outside, i.e. provided with an outer body, were to be positioned next to one another in contact.

Such an attachment element of the first design can be fixed on both sides to both inner bodies by means of the same fixing elements, which are otherwise also used for fixing the outer paneling, i.e. the side walls of the outer body, to the side faces of the inner body.

However, it is also necessary in this case to consider the problem that the second inner body, which is attached to the originally provided inner body, usually does not have a substructure which is as stable as the originally provided inner body in the form of a peripheral, complete base which has been partially sunk into the ground, but should either only have a smaller, more provisional base or, in an extreme case, even no base at all, but the additional inner body together with its internals should be borne completely by it being fixed to the originally provided inner body.

The attachment element correspondingly preferably extends over the entire height of the inner body and also has the fixing elements for the parts of the outer body, distributed over the entire height.

If the attachment parts are formed as strips separately for the front and the rear joint of the inner bodies, these may be separately configured attachment strips, but preferably one and the same attachment strip should be capable of being used both for the front and for the rear joint.

The fixing between the two inner bodies, which generally comprise peripheral, linear frames consisting of profile struts, takes place by means of a screw connection or an interlocking connection, and in this case in particular by means of those outer holders via which normally the side walls are fixed to the outsides of the inner body, i.e. hung on them.

The spaced-apart inner bodies are bridged at least on the upper side, if necessary also on the front and rear side, by a shielding plate in order to protect the common interior of the two inner bodies from the ingress of water from the outside at the joint and conversely to avoid the emission of electromagnetic radiation from this joint.

The connection between the two inner bodies therefore needs to be able to absorb sometimes very considerable forces, with the result that the attachment element between the inner bodies is preferably made from metal in order to ensure sufficient stability.

The connection between the attachment element and the two inner bodies likewise needs to be able to take these high loads occurring, for which the outer holders with which the outer body or its paneling parts are normally fixed to the inner body are not designed, with the result that although they are suitable for fixing the attachment element in terms of their size, i.e. the distance provided by them from the inner body, they sometimes may not have the required stability.

Alternatively, therefore, a second design of an attachment element is made available which solves these problems by virtue of the fact that the attachment element is not positioned between the two inner bodies to be connected, but these two inner bodies are fixed directly to one another and, as a result, the optimum stability is provided. The fixing is preferably carried out by screwing.

The attachment element or, in the case of a strip-shaped design of the attachment element, the two attachment elements for the front and rear side is/are then fixed to one of the two inner bodies or to both inner bodies at the same time.

In this case, too, the attachment elements provide two sets of fixing elements which are adjacent to one another in the view from the front and the rear for fixing the adjacent doors and rear walls.

As regards the stability, these attachment elements only need to provide sufficiently secure fixing of these rear walls and doors and do not need to be able to ensure the entire fixing of the attached inner body. Therefore, these designs of the attachment elements can be produced in a cost-effective manner for example from plastic using injection-molding technology.

However, another problem results from the direct fixing of the two inner bodies.

Since the outer paneling, which represents the outer body, is generally fitted at a specific distance from the inner body, the fixing apparatuses which are provided by the attachment elements must be positioned offset from the contact plane of the two inner bodies in the direction of the attached inner body, in order that rear walls and doors of the outer paneling of the originally provided body can be reused.

As a result, however, physically identical outer paneling elements such as rear walls and doors for the attached inner body can no longer be used if said inner body has a width, when viewed from the front, which is precisely the same size as the originally provided inner body since in this case the rear wall and the doors would be too wide.

In general, however, an inner body comprises individual profiles, which have been cut to length and which are connected to one another merely via cubic connectors in the corners of the frame-shaped inner body. This makes it possible, without considerable complexity, to widen the front view of the attached inner body by horizontal struts being cut to a longer length by such a degree that the rear walls and doors which are available in standard dimensions can be used for the attached inner body as well.

Furthermore, no additional bridging of a gap between the two inner bodies is necessary, with the result that the sealing against the ingress of moisture at this point can also be implemented in a much more simple manner.

The attachment element can be fixed to the inside of the vertical struts of the attached inner body, in particular if it runs around the periphery in the form of a closed frame from the front edge to the rear edge.

If attachment strips are involved, these attachment elements, when viewed in the plan view, are preferably in the form of an L with a short limb, which is in each case fixed parallel to the width of the attached distribution cabinet on the front face of the two inner bodies, which results in a particularly stable fixing and, in addition, fixes the two inner bodies with respect to one another. The fixing is preferably carried out on the two front, adjacent vertical struts of the two inner bodies. The fixing is preferably carried out by screwing.

If in this way two inner bodies are attached to one another and, as a result, a common interior is provided which is primarily accessible all the way through, this attached distribution cabinet also needs to have a roof, which very often not only has the function of weather-related protection against rain, etc., but in which active elements for deventilating or heat removal or even cooling of the components in the interior of the distribution cabinet are often also arranged.

Since, irrespective of the design of the attachment element used, the attached distribution cabinet has a total width which corresponds to the width of two completely paneled, individual distribution cabinets which have been positioned so has to be in contact next to one another, two roofs used for such individual distribution cabinets with standard sizes could also be emplaced next to one another on the attached distribution cabinet.

However, then an unsealed gap or a gap which is only difficult to seal would result between the two roofs, which gap could make it possible for rain etc. to enter from above.

Another possibility would consist in a new, entire roof with the width of the attached distribution cabinet being made available, which would result, however, very rapidly in a very large number of roof widths in view of the possible different width combinations of attached distribution cabinets which individually are available not only in a standard width but in a plurality of widths.

The invention instead preferably proposes designing the roof in the required width in modular fashion by it comprising, along its length, i.e. the width of the distribution cabinet, individual longitudinal modules, corresponding to the standard width of the individual distribution cabinets offered for sale by the manufacturer, and furthermore end modules, which represent a lateral termination of the roof, and connecting modules, which provide a connection between two adjacent longitudinal modules, to be precise with such a spacing that they compensate for or bridge the gap produced between two longitudinal modules if the distribution cabinet involved is one which has been attached.

In the same way as an integral, closed roof is fixed, in particular screwed, from the inside and therefore cannot be lifted off from the outside in order not to allow access to unauthorized personnel to the interior of the distribution cabinet, these elements also need to be designed in such a way that they cannot become detached from one another from the outside in the ready-fitted state of the roof.

This can be ensured, for example, by virtue of the fact that both the end modules and the connecting modules rest on the longitudinal modules at the edge. If connecting modules and end modules are screwed with respect to the inner body from the inside in the fitted state, they thereby also secure the longitudinal modules located therebeneath.

In general, such a roof of a distribution cabinet not only comprises the actual cover-like part, but a roof basic body, which is located therebeneath and has a peripheral, vertical edge, on which the actual cover is emplaced, which cover usually engages over this edge for reasons of protection against the weather.

In the case of a roof which has such a design, preferably only the cover is assembled in modular fashion as described above, while the roof basic body is designed to be continuous beyond any joint between the two inner bodies. In this case, the roof basic body usually likewise comprises individual profiles, which run in the width and depth of the cabinet and are connected via corner elements to form a horizontally peripheral frame, with the result that said frame can be achieved continuously over the entire width in a simple manner by the profiles defining the width of this basic body being correspondingly cut to length.

The widths of the longitudinal modules of the roof are in this case either the standard widths which the manufacturer provides on individual distribution cabinets or else are merely matched to the widths of the individual front doors of such individual distribution cabinets.

The advantage of the last-mentioned variant consists in the fact that it can provide individual distribution cabinets which have a width which is achieved by two front doors with different widths. As a result, the manufacturer can make available a very large number of different total widths of individual distribution cabinets by means of a limited number of front doors with different widths. The number of longitudinal modules of the module roof required is not increased hereby, however. Preferably, the connecting modules are in this case dimensioned such that, despite the intended close bridging of two mutually attached inner bodies, two end modules positioned back-to-back with respect to one another could also be used in the roof instead of one connecting module, which is sometimes required for special applications.

A construction kit, in order to construct an individual distribution cabinet or distribution cabinets attached to one another comprising a plurality of inner bodies, in the simplest case, if only a standard width of individual distribution cabinets were to be available, therefore comprises at least horizontal frame profiles of different lengths for the inner body, either for a width corresponding to the inner body of a separate distribution cabinet and comparatively longer frame profiles for the wider attachment inner body. In this case, in addition to the end and connecting modules, at least one length of longitudinal modules is required in the roof parts, corresponding to one standard width of an individual distribution cabinet or corresponding to the width of one of the two doors, which then in this case have the same width.

If a plurality of widths are offered on separate distribution cabinets and possibly comprise a plurality of door widths, the construction kit is correspondingly more extensive since the longitudinal profiles of the inner bodies need to be available for each standard width of an individual distribution cabinet depending on the width for which attachment inner bodies are provided, and also the respectively extended variant.

The same is true for the longitudinal modules of the module roof, depending on whether the lengths of the longitudinal modules of the roof are matched to the widths of the total individual distribution cabinets or to the door widths of the individual distribution cabinets.

If, therefore, the corresponding constructional elements are present, for example in the form of a construction kit, it is possible in a simple manner to laterally extend an existing distribution cabinet by an additional laterally attached inner body using the following method First the outer body is removed from the existing distribution cabinet to such an extent that that side on which the attachment inner body is intended to be positioned is freely accessible. Also, a shielding plate which may be provided there on the side face is removed.

Then, the attachment inner body is fixed directly or indirectly to the existing inner body, possibly after a further base has been positioned, for supporting the attachment inner body, alongside to the existing base. The attachment element(s) is/are, depending on the design of the attachment element, in this case either placed between the inner bodies or fixed adjacent to the inner bodies, which have been screwed directly to one another.

As soon as the attachment inner body has been fixed, a further mounting rack can be implemented therein and the necessary internals can be implemented on said mounting rack, it being possible under certain circumstances for the mounting rack to be fixed on its own even in advance to the inner body, before the latter is screwed to the original inner body.

Once the internals in the new inner body have also been electrically connected and activated, the new inner body is clad with an outer body and, in the process, rear walls and doors are fixed to the attachment element.

Prior to or after the electrical connection and activation, the module roof, which is established corresponding to the length of the attachment distribution cabinet, is also assembled and emplaced and screwed to the inner body from the inside.

IV. BRIEF DESCRIPTION OF THE DRAWINGS

Embodiments in accordance with the invention will be described in more detail by way of example in the text which follows. In the drawings.

V. DETAILED DESCRIPTION

Figure 1:
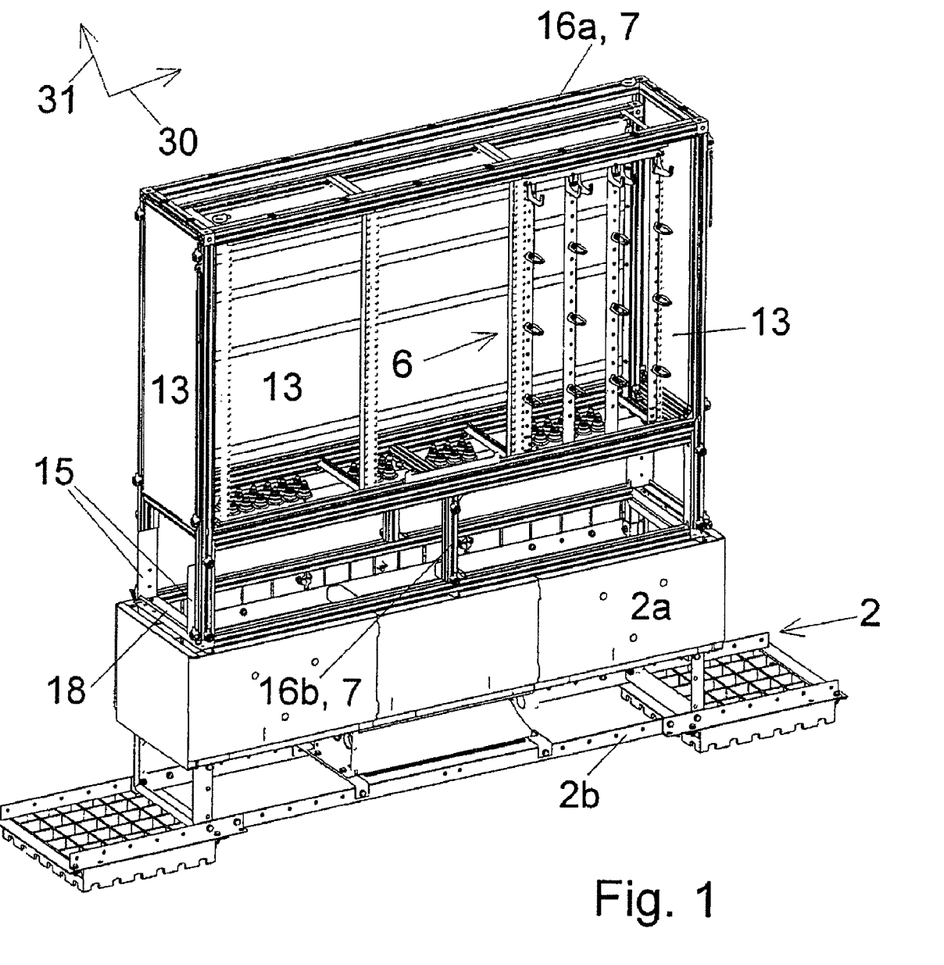
FIG. 1 shows an individual distribution cabinet on a base without outer paneling and without internals.

FIG. 1 shows a distribution cabinet according to the invention, but without the outer body in the form of paneling and without internals, which are normally provided in the interior of the inner body 21 and in particular on the mounting rack 6 there and are connected to the cables (not shown), which have been routed up from underground.

The inner body 21 is a frame, comprising frame profiles 7, which run along both the outer edges of the upright, parallelepipedal inner body 21 and furthermore also have further horizontal and vertical struts therebetween.

The entire inner body 21 rests on a base 2, comprising a base foot 2b with a metal construction, which is partially sunk into the ground, and a base box 2a, which surrounds the base on the outside above ground level and is generally made from plastic.

The inner body 21, which in accordance with the prior art is emplaced as a unit on the base 2 and is fixedly connected to said base, in the prior art and also here comprises a body frame 16 with frame profiles 7 along at least the outer edges of the upright, parallelepipedal inner body 21, whose surfaces are paneled if required with shielding plates 13 and closed in order to produce the EMC-sealing of the housing.

Figure 2A:
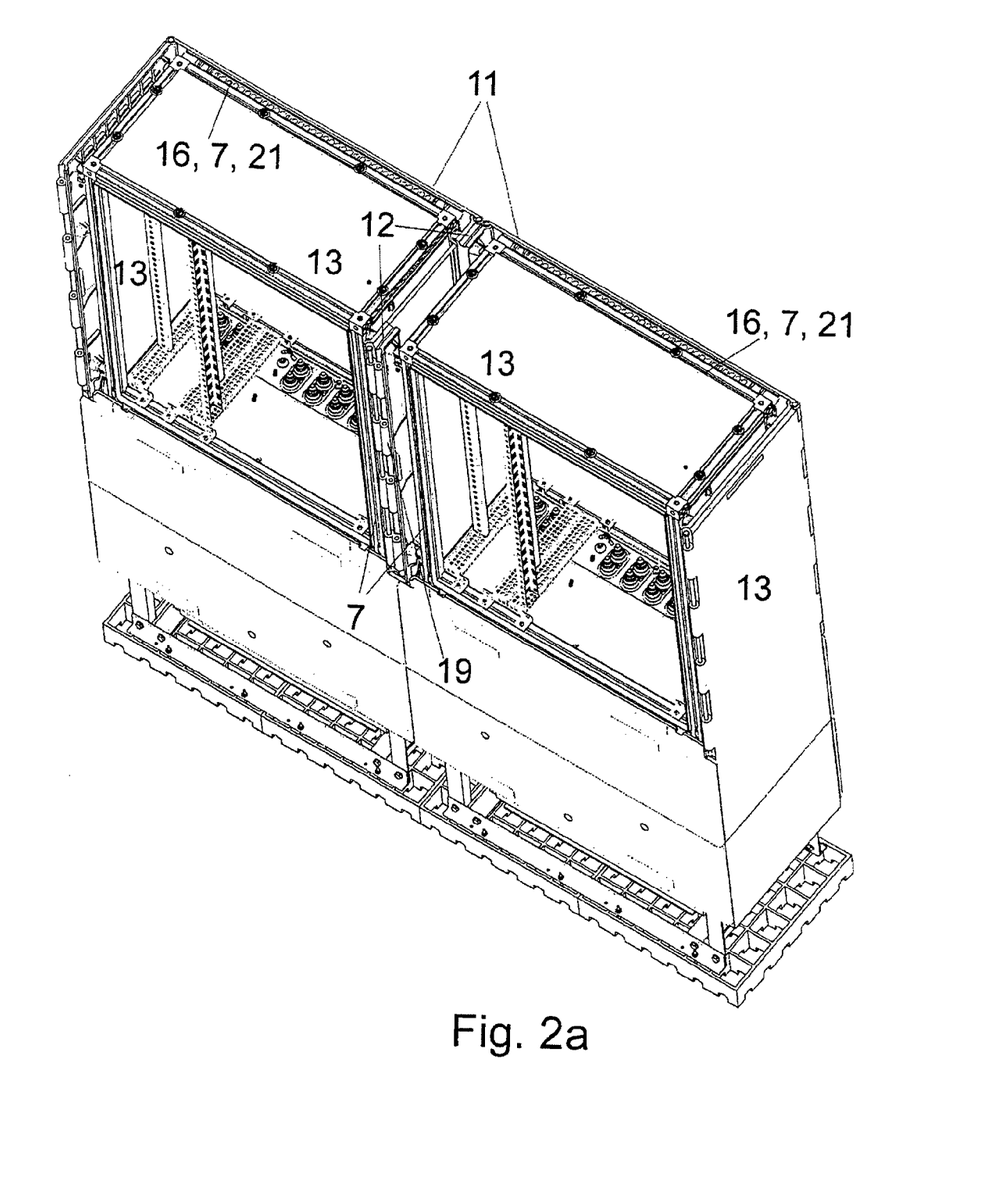
FIG. 2a shows a distribution cabinet which has been laterally extended in comparison with the cabinet in FIG. 1 by a further inner body.
Figure 3:
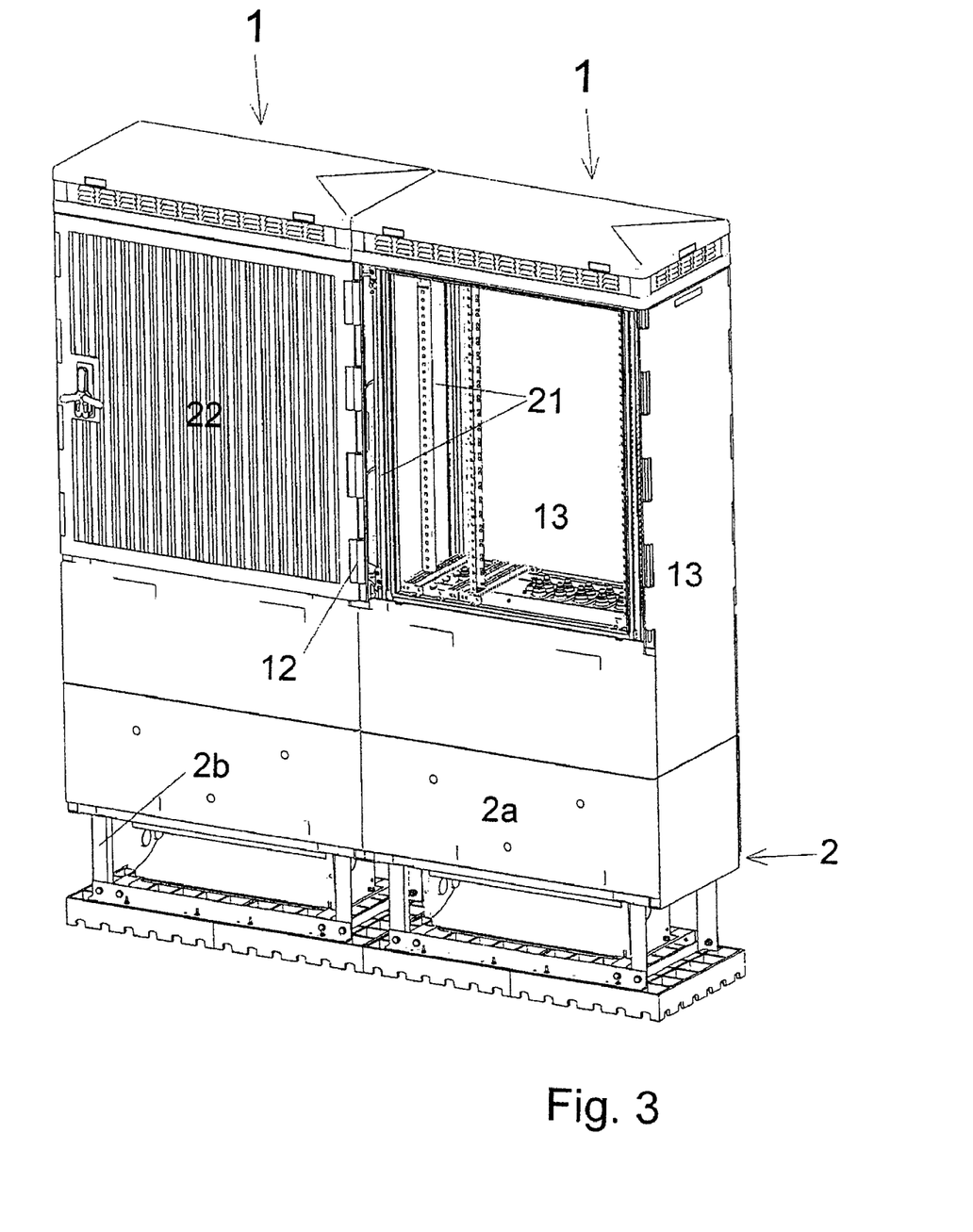
FIG. 3 shows the thus extended distribution cabinet for the most part with the outer body.

In the present case, the body frame 16 is in the form of two parts with a lower body frame 16b and an upper body frame 16a, whose extent can be seen better in FIGS. 2a and 3.

Figure 4A:
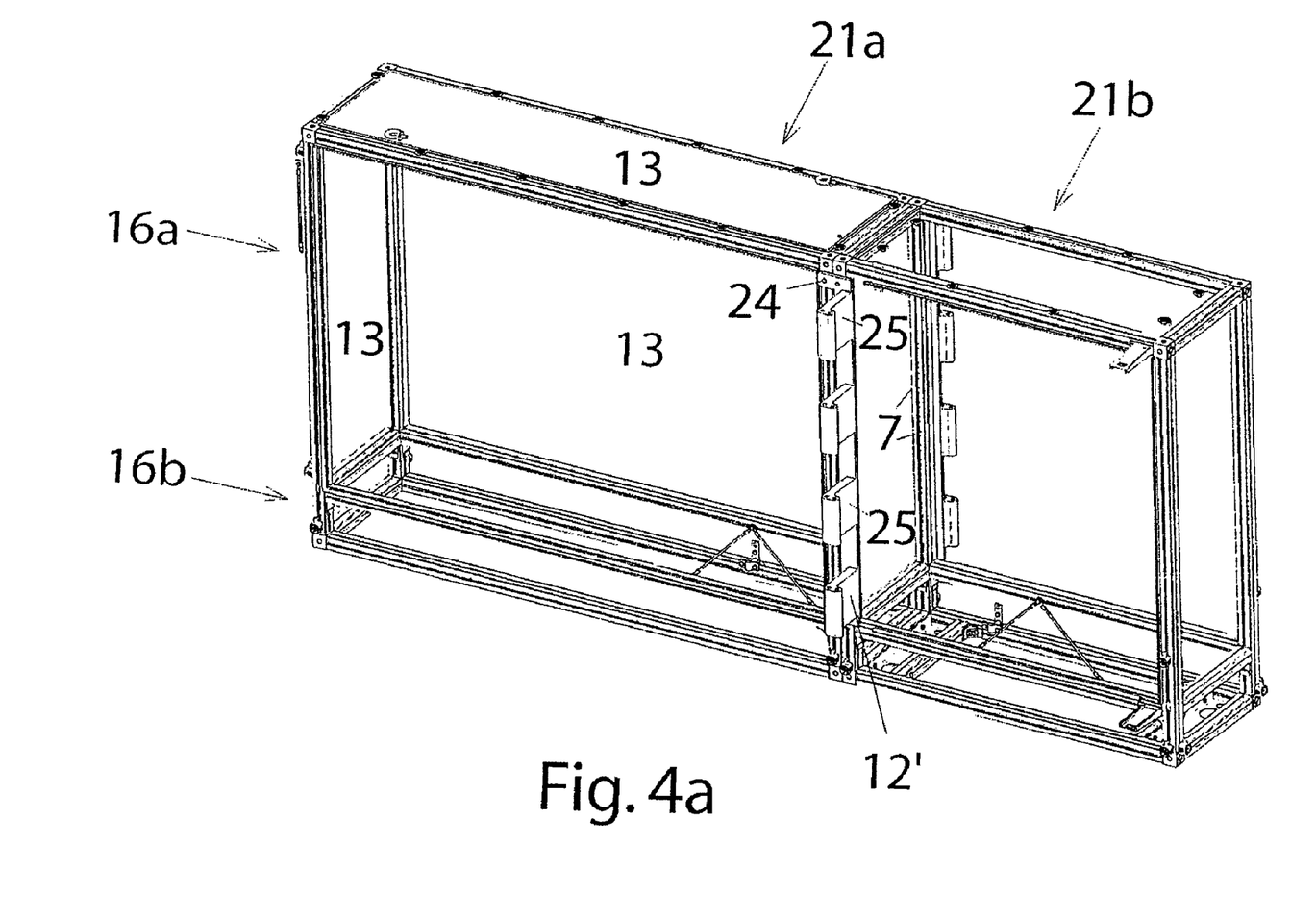
FIG. 4a shows a partial illustration of a distribution cabinet which has been extended by a further inner body.
Figure 5A:
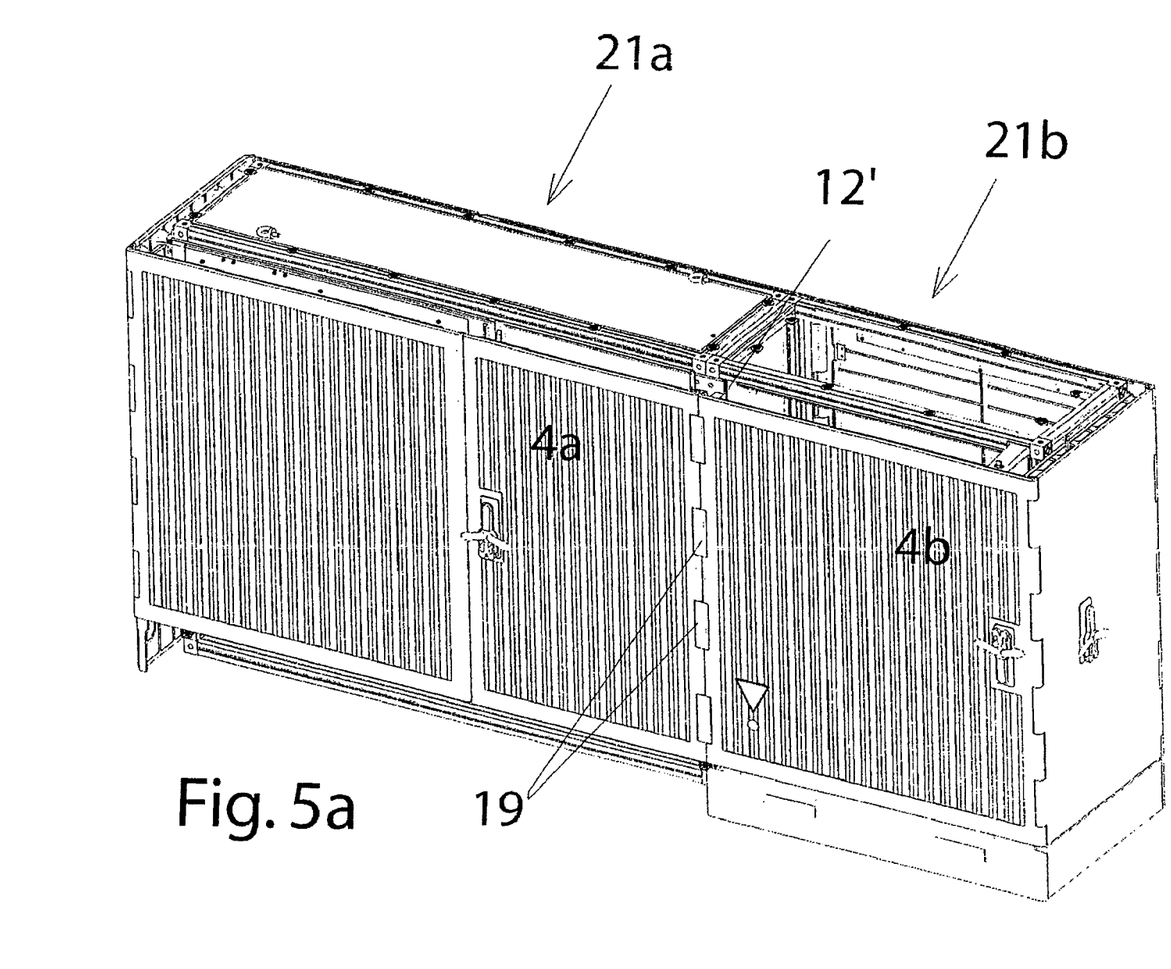
FIG. 5a shows the thus extended distribution cabinet shown in FIG. 4 in a partially paneled view at an angle from the front.

The lower body frame 16b, which can only be seen in FIGS. 1 and 4a, comprises approximately 20% of the height of the total body frame 16 and in terms of basic area is slightly smaller than the base box 2a, with the result that the paneling, which is then fitted externally on the body frame 16 with a spacing and forms the outer body 22, as can be seen in FIGS. 3 and 5a, is aligned vertically with the base box 2a therebeneath.

The lower body frame 16b is in turn in the form of a parallelepiped with horizontally running frame profiles 7 and, depending on the size, transverse struts, running vertically therebetween, from such frame profiles 7, while the sides comprise side frames 18, which run around the periphery in the form of a rectangle or else are in the form of a U and are open at the top, which side frames 18 comprise preferably bent-back plates.

The bending-back is necessary in order for the vertical limbs of the side frames 18 to have, when viewed in the plan view, plate faces which run both in the longitudinal direction 30 and in the transverse direction 31 of the distribution cabinet 1, which plate faces form an angle which is open obliquely towards the outside, for example from the bottom face of the distribution cabinet.

These vertical plate angles are used as guides 15 in order to accommodate the ends of vertical frame profiles 7 of the upper body frame 16a which run out downwards freely therein and to hold them in the two horizontal directions, since these ends of the vertical frame profiles 7 are held at such a distance from one another over the rest of the horizontally running frame profiles of the upper body frame 16a that they fit precisely into the guide 15 of this lower body frame 16b.

The upper body frame 16a is in turn parallelepipedal, approximately with the same basic area as the lower body frame 16b, the vertical frame profiles of the upper body frame 16a being extended downwards to such an extent over the lower edge of the parallelepiped that they reach down as far as the lower transverse limb of the side frames 18 of the lower body frame 16b or even rest on it and in the process run downwards outside the lower body frame 16b.

After locking by means of simple plug-type bolts on the lower body frame 16b, possibly with additional latching, the upper body frame 16a can no longer be drawn off upwards since the entire body frame 16 then forms a fixed unit.

Figure 2B:
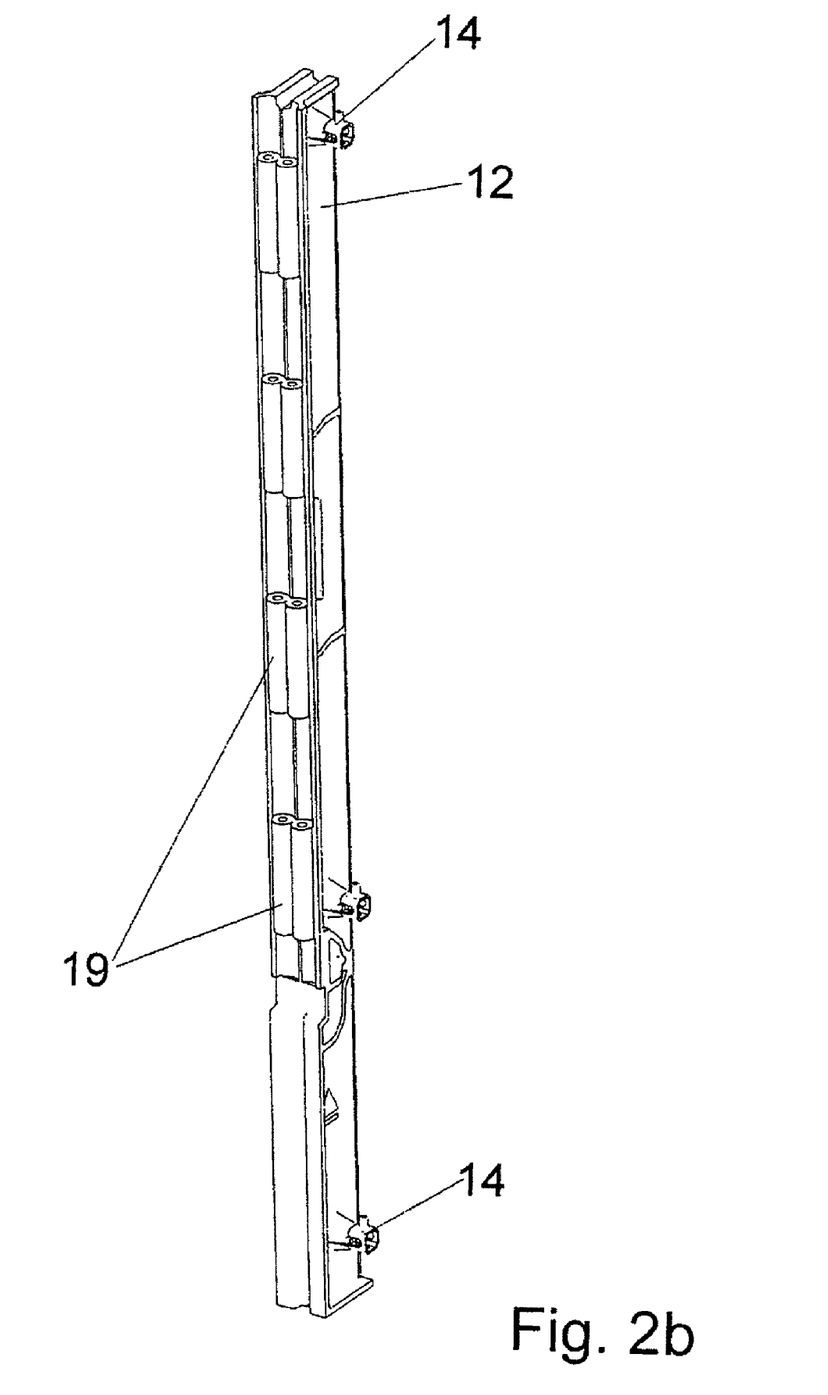
FIG. 2b shows the attachment element used in this case in a first design.

As can be seen in FIGS. 1 to 3, the upper body frame 16a is clad with shielding plates 13 on the upper side and rear side and on the side faces, but down as far as its lower horizontal struts, which, as shown in FIG. 1, in the emplaced state comes to lie just above the upper horizontal strut of the lower body frame 16b or even rests on it.

In addition, FIG. 1 shows best the fact that the mounting rack 6 on which the majority of the subsequent electrical internals are fitted protrudes vertically upwards from the inner face of the lower body frame 16b, preferably close to its rear edge, and has a height which, in the emplaced state, reaches as far as close to the upper end of the upper body frame 16a, i.e. makes as full use as possible of its interior.

As a result, the insides of the distribution cabinet 1 which are mounted on the mounting rack 6 can be mounted and remain in operation even if the upper body frame, preferably once the outer paneling has been removed as illustrated in FIGS. 1 to 3, is detached in its connection from the lower body frame 16b and lifted or drawn off completely upwards in order to repair it or to completely replace it.

Even individual parts of the lower body frame 16b can then be replaced without the internals needing to be disconnected and dismantled, possibly a provisional mechanical support for the rest of the body frame 16 needing to be produced for the time of the replacement of the individual part.

FIG. 3 shows two laterally adjacent distribution cabinets, with an outer body 22, but with a door of the outer body missing, but likewise in turn without internals, as the empty interior of the right-hand distribution cabinet 1 shows.

As a deviation from FIG. 1, the narrower base foot 2b is the base 2 used, which in this case does not go beyond the dimensions of the basic area of the upper part of the distribution cabinet 1 in terms of its width.

The two distribution cabinets 1 in FIG. 3 are not positioned loosely next to one another, however, but are connected to one another via an attachment elements 12 in the form of attachment strips, of which one is illustrated separately in FIG. 2b.

The connection point between the two distribution cabinets 1 is illustrated at an angle from above in FIG. 2a, with the outer body 22 removed However, it is first necessary to mention the fact that the outer body 22 is fixed in the form of outer paneling to the body frame 16 of the inner body 21 via outer holders 14, which can be seen in FIG. 2b, for example, and are fixed to the outer faces of the frame profiles 7 and act as spacers with respect to the plate-shaped elements of the outer body 22 which are fixed thereto, usually only hung thereon.

Since the front side of the outer body 22 is generally formed from one or more doors 4, these doors need to be articulated on hinges, and these hinge parts are formed in the side parts of the outer paneling, i.e. of the outer body 22.

Instead of positioning two complete, outwardly clad distribution cabinets next to one another, as a result of which a separating plane between the two distribution cabinets in the form of the side parts of the outer paneling is formed, at least two bodies 3, in particular two complete distribution cabinets 1, i.e. with the base, can be positioned next to one another in such a way that an interior which is continuous over the two bodies 3 is achieved, which greatly facilitates the connection of the internals in the two bodies 3.

If, for this purpose, the side parts of the outer paneling 22 of the two bodies on mutually facing sides are removed, the corresponding hinge-mounting on the front side for the adjacent front doors 4 and on the rear side for the adjacent rear wall 11 is lacking.

This aim is fulfilled by the attachment strip 12, which is mounted along the front and rear vertical edge between the two bodies 3, is plastic-injection-molded as is the outer paneling 22 and provides corresponding mountings for the hinge parts of the doors 4 on the front side and the rear walls 11 on the rear side.

This attachment strip 12 is in turn fixed on both sides by means of the outer holder 14 to the vertical struts of the adjacent body frame 16 and they have a depth which corresponds approximately only to the thickness of the frame profiles, with the result that the interior is freely continuous in the transverse direction in the depth region between the front and rear vertical profile 7.

Front and rear attachment strips 12 have an identical design, and, in the case of a normal side part of the outer paneling, the front and rear edges likewise have an identical design.

The mechanically stable connection between the left-hand and the right-hand body frame 16 is not formed by the attachment elements 12, in particular attachment strips, however, which are generally only made from plastic, but by additional stable connecting elements, whether it be by means of screw connections or connecting clips, which fixedly connect the two body frames, preferably the vertical frame profiles of the two adjacent body frames 16 which run adjacent to one another.

These connecting elements are not illustrated in the figures and, in particular in the case of a screw connection, can also extend through the attachment elements 12 through drilled holes provided there.

FIG. 2b shows such an attachment strip 12 with the sleeve elements, which are provided in sections along the front edges and act as hinge parts for the door articulated thereon once a spindle has been pushed through.

At the upper and lower end and once in between, in total three outer holders 14 are fitted to the side faces, as are also provided on the opposite side (not shown) of the attachment strip 12 and in the same form, but positioned slightly lower or higher on the vertical profiles of the profile frame, since said outer holders 14 have a journal at the top in the vertical direction and an appropriately sized opening at the bottom, or vice versa, with the result that such an outer holder 14 can be positioned on another one and can be inserted into the latter, as a result of which the attachment strip 12 is hung on the first profile frame and, in the next step, the second profile frame 16 is hung on the attachment strip 12.

Owing to the additional stable connecting elements of the two profile frames 16 with respect to one another, which are not illustrated, the second profile frame 16 is held so stably on the first that it can also be equipped with internals and operated without being supported by a base or possibly only by relatively simple supporting with the aid of an auxiliary frame, which is fixed to the first distribution cabinet.

Figure 4B:
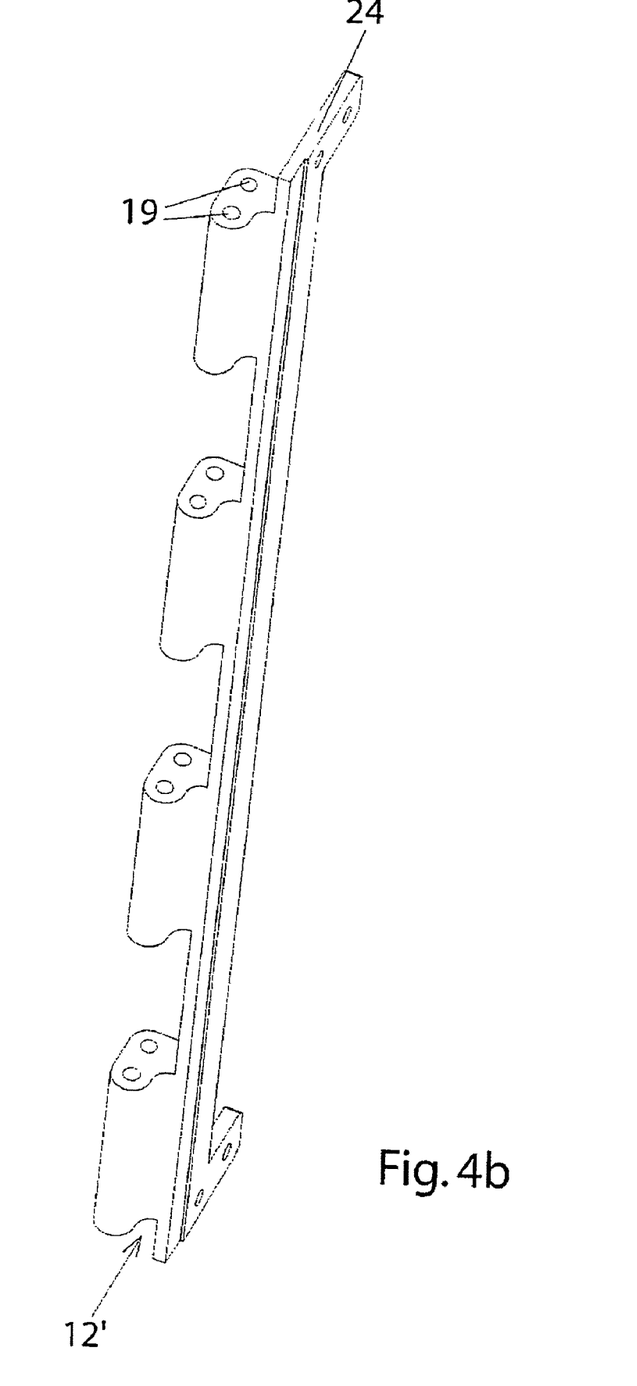
FIG. 4b shows the attachment element used in this case in a second embodiment.
Figure 5B:
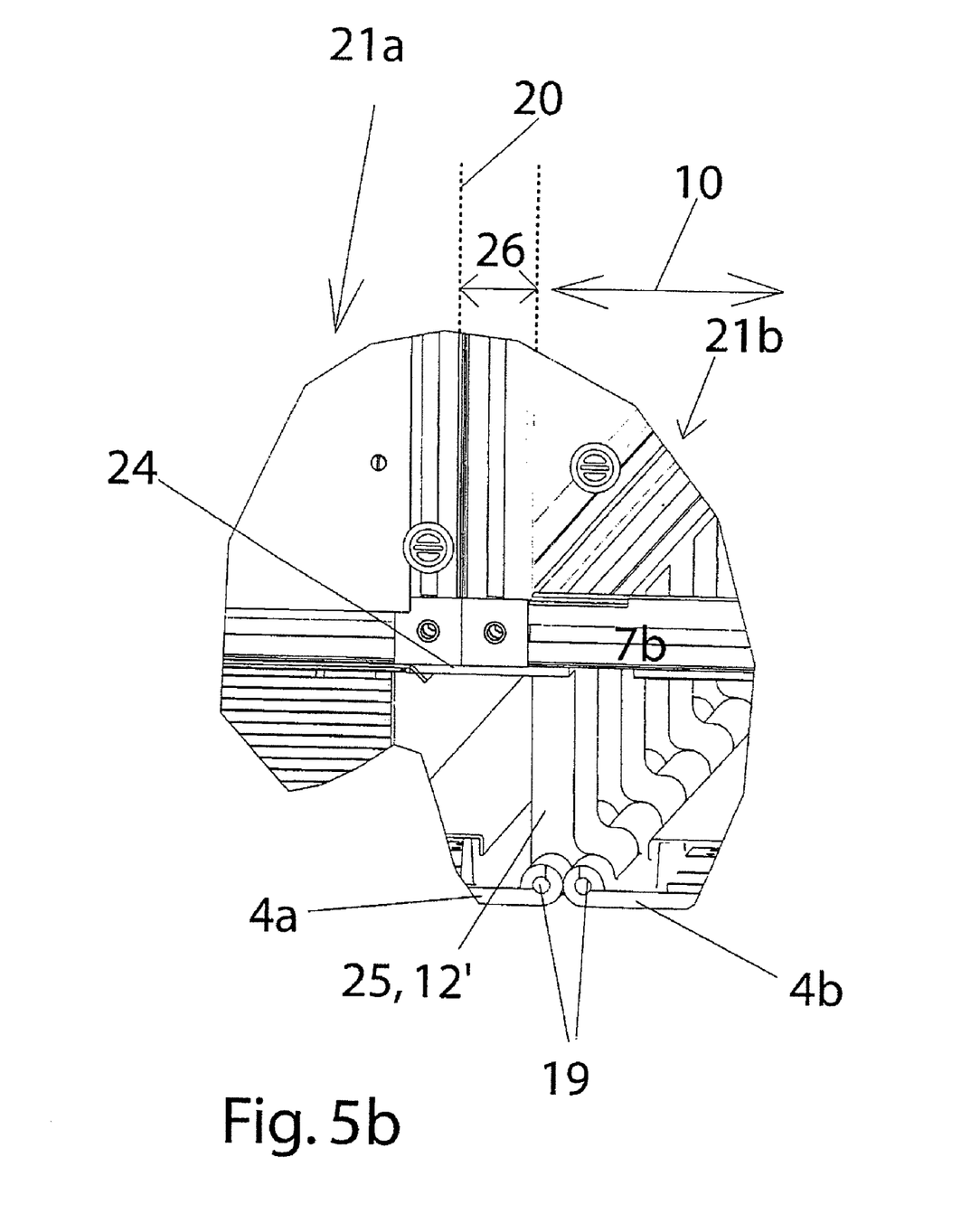
FIG. 5b shows the state in FIG. 5a approximately perpendicularly from above.

FIGS. 4 and 5 show another type of arrangement for attaching a further inner body laterally to an already existing inner body of an individual distribution cabinet FIG. 4a shows such an attachment arrangement using only the inner bodies 21a, b, which have partially been provided with shielding plates 13, but without internals, base and outer body.

The decisive difference from the attachment method in FIGS. 2 and 3 consists in the fact that, in the present case, the inner bodies 21a, b are directly connected to one another with their vertical struts and there is no attachment element between them.

The connection can be designed to be correspondingly stable, for example by means of screwing or by means of clips, with the result that an additional sufficiently stable connection is no longer necessary.

The attachment element 12' is accordingly designed differently and is arranged primarily with respect to the two mutually connected inner bodies (see FIGS. 4a and 5b) in such a way that the hinge elements 19, which when viewed in the plan view lie next to one another, are no longer positioned on both sides of the contact plane 23 of the two mutually attached inner bodies 21a, b, but offset with respect thereto in the width region of the attached inner body 21b.

The attachment element 12' is in turn in the form of an attachment strip in this case, too, which attachment strip is used separately in each case for the front edge and rear edge of the attachment arrangement between the two bodies and is not in the form of an internally closed peripheral frame.

In the plan view, the attachment element 12' is in the form of an L with a short limb 24 in the upper and lower region, which limb extends, in the fitted state, along the width 10 of the attached cabinet.

The long limb 25 protrudes forwards from the front face of the inner bodies and is designed to be interrupted in terms of its height.

The individual vertical sections bear, on their front free ends in the width direction and next to one another, the vertical passages, which provide the hinge elements 19 for the rear wall 11 or the doors 4a, b.

The short limb 24 in addition makes available the required lateral spacing of these hinge elements with respect to the contact plane 20 between the two inner bodies and is also used for screwing the attachment element 12' to the front face of the vertical struts of the two inner bodies 21a, b, to be precise of the two adjacent vertical struts of the two inner bodies, which results in a particularly stable connection.

Theoretically, a screw connection on the inside of the vertical struts of the attached inner body would also be possible, possibly whilst dispensing with the short limb, which in the illustrated state is provided in any case only on the upper and lower end since this is sufficient for the stability.

The lateral offset in the direction of the width 10 of the hinge elements 19 of the attachment element 12' can be seen in the front view in FIG. 5a with the door paneling, but better still in the plan view in FIG. 5b which is virtually perpendicular thereto This shows the inner bodies 21a, b, which abut one another directly at the contact plane 20, and the attachment element 12', which provides the adjacent hinge elements 19 with the required spacing in front of the front face of the inner bodies 21a, b, to be precise laterally offset with respect to the contact plane 20.

As a result, the left-hand hinge element 19 in FIG. 5b is located so far outside the outer face of the left-hand inner body 21a and also with the correct spacing at the front that the door 4a which was originally provided on the individual distribution cabinet with the single inner body 21a can again be used.

In order also to be able to use a door 4b with a standardized width on the right-hand hinge part 19, the horizontal struts 7b of the inner body 21b, which fix the width 10 of the inner body 21b, are extended in comparison with the standard dimension, to be precise by double the width of the spacing 26 from the center between the hinge parts 19a, b of the correctly fitted attachment element 12' as far as the contact plane 20.

The attachment element 12' is preferably the same for the front and rear side and is merely fitted such that it is rotated through 180°.

A distribution cabinet 1 which has an enlarged width and is attached in such a way again requires a roof as a covering at the top. A corresponding roof solution is illustrated in FIG. 3 in the form in which a separate roof is emplaced on each of the cabinet parts, with a joint between the two cabinet parts.

This is possible, but not optimal for sealing reasons, since in this case, rainwater, for example, may enter the cabinet from above.

Preferably, a roof is therefore emplaced which, in the simplest case, merely comprises a correspondingly dimensioned cover, preferably with a slightly curved or sloping surface for allowing the rainwater to flow away.

Figure 6A:
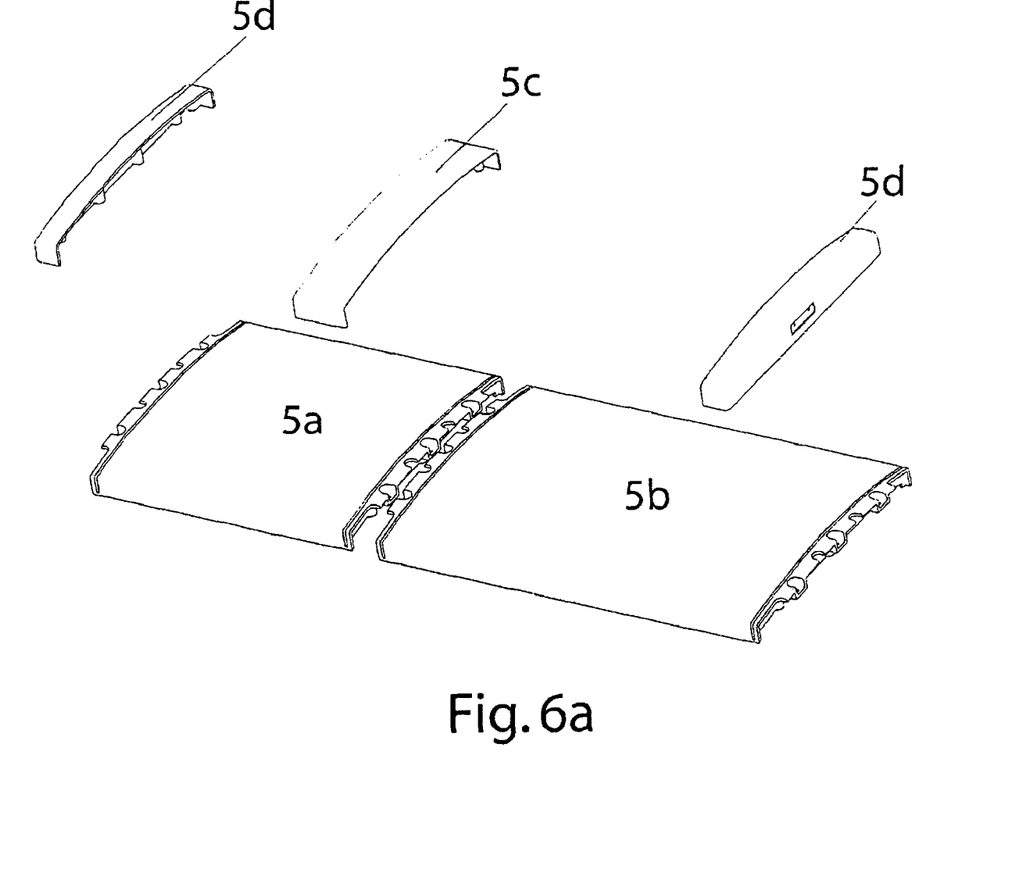
FIG. 6a shows the parts of a module roof.

FIG. 6a shows such a module roof in individual parts, which can be produced for any desired cabinet width by it comprising end modules 5d, which form a lateral termination, and longitudinal modules 5a, b, whose lengths are dimensioned so as to fit the width of the individual inner bodies 21a, b or else so as to fit the width of the doors 4a, b used on these inner bodies.

Mutually adjoining longitudinal modules 5a, b are connected to one another by a connecting module 5c, which is preferably emplaced on the joint and overlaps the starts of the adjacent longitudinal modules 5a, b slightly at the top, as is preferably also the case in the end modules 5d.

The individual modules engage in one another in an interlocking manner and are secured in the fitted state with respect to one another with the result that, in the ideal case, only the end modules 5d need to be screwed to the inner body from the inside once the inner body has been emplaced and, as a result, all other modules are securely held on the inner body.

An additional screw connection, for example of the connecting modules 5c, can provide additional stability.

Figure 6B:
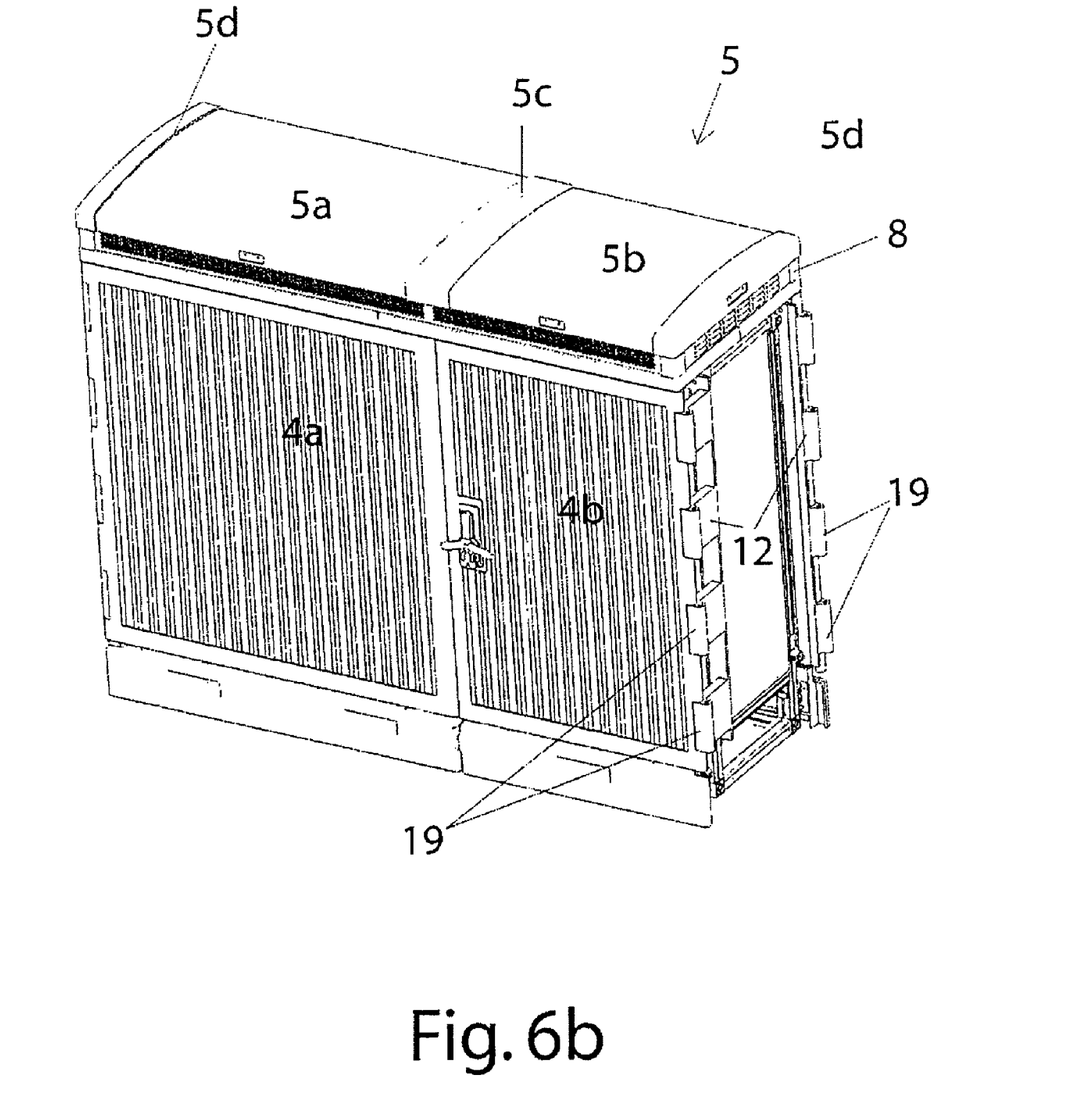
FIG. 6b shows a ready-fitted roof of an original, individual distribution cabinet.

In general, however, a roof not only comprises the cover illustrated in FIG. 6a but also a roof basic body 8, which can be seen in FIG. 6b using the example of an individual distribution cabinet whose side wall has been removed and to which the attachment elements 12 in accordance with the first attachment method (i.e. FIGS. 2 and 3) have already been fixed in order to attach a further inner body.

In this case it is obvious that the roof basic body 8 has a vertical, peripheral edge, in which, for example, air outlet openings can be provided for ventilation or cooling elements accommodated in the roof.

Using these examples it is also apparent that in this case the cover 5 also comprises the elements of the previously described module roof, and accordingly what is involved is an individual distribution cabinet with only a single inner body, but with the longitudinal modules 5a, b of the cover 5 of the roof being matched to the width of the doors 4a, b, which close the front face.

The longer roof basic body 8 required once this individual distribution cabinet has been attached is, however, preferably designed so as to be continuous beyond the joint between the inner bodies, for which purpose the profiles and plates which define the width extent of this roof basic body need to be cut to the corresponding total length.

Together with corresponding corner elements and the plates and profiles determining the depth, the roof basic body is then assembled from these again.

LIST OF REFERENCE SYMBOLS

| | |
|---|---|
| 1 | Distribution cabinet |
| 2 | Base |
| 2a | Base box |
| 2b | Base foot |
| 3 | Body |
| 4a, b | Door |
| 5 | Cover |
| 5a, b | Longitudinal modules |
| 5c | Connecting module |
| 5d | End modules |
| 6 | Mounting rack |
| 7 | Frame profile |
| 8 | Roof basic body |
| 9 | Side wall |
| 10 | Width |
| 11 | Rear wall |
| 12 | Attachment element |
| 13 | Shielding plate |
| 14 | Outer holder |
| 15 | Guide |
| 16a | Upper body frame |
| 16b | Lower body frame |
| 18 | Side frame |
| 19 | Hinge element |
| 20 | Contact plane |
| 21 | Inner body |
| 22 | Outer body |
| 24 | Short limb |
| 25 | Long limb |
| 26 | Spacing |
| 30 | Longitudinal direction |
| 31 | Transverse direction |

The invention claimed is:

1. An extended distribution cabinet formed from a distribution cabinet, the distribution cabinet having a first inner body, the extended distribution cabinet comprising:
   a second inner body coupled to the first inner body to form a body frame;
   at least one attachment element coupled to the body frame;
   an outer body including spaced paneling installed on the body frame, the spaced paneling including a plurality of panels and at least one door, at least a portion of the outer body being coupled to and supported by the attachment element; and
   a mounting rack for fixing internal components to the body frame, the mounting rack being fixed on the body frame.

2. The extended distribution cabinet as claimed in claim 1, wherein each attachment element includes a plurality of attachment members configured to receive and support the portion of the outer body.

3. The extended distribution cabinet as claimed in claim 1, wherein the second inner body is coupled to the first inner body without the second inner body being supported by a further attached base.

4. The extended distribution cabinet as claimed in claim 1, wherein the attachment element extends over an entire height of the first inner body.

5. The extended distribution cabinet as claimed in claim 2, wherein the first inner body is spaced from the second inner body and the attachment element is positioned between front vertical struts of the first and second inner bodies, the attachment members of the attachment element defining hinge parts configured to support doors of the outer body, and
   wherein a second attachment element is positioned between rear vertical struts of the first and second inner bodies, the attachment members of the second attachment element being configured to support rear walls of the outer body.

6. The extended distribution cabinet as claimed in claim 5, wherein free space between the first and second inner bodies is covered via shielding plates, wherein the shielding plates include at least one shielding plate on an upper side of the free space.

7. The distribution cabinet as claimed in claim 5, wherein the attachment members of the second attachment element define hinge parts.

8. The extended distribution cabinet as claimed in claim 1, wherein the body frame includes a plurality of outer holders that are configured to support the spaced paneling of the outer body, and wherein the attachment elements are each fixed to at least one of the outer holders.

9. The extended distribution cabinet as claimed in claim 1, wherein the first and second inner bodies are fixed directly to one another and wherein the attachment element is fixed to at least one of the inner bodies.

10. The extended distribution cabinet as claimed in claim 9, wherein attachment members of the attachment element are positioned laterally offset with respect to a contact plane extending between the first and second inner bodies.

11. The extended distribution cabinet as claimed in claim 10, wherein the attachment element is mounted so that the attachment members are positioned in a region of the second inner body.

12. The extended distribution cabinet as claimed in claim 9, wherein the width of the second inner body is extended compared to the first inner body, the extension corresponding to a distance between two distribution cabinets which have been individually equipped with an outer body and have been positioned so as to be in touching contact next to one another.

13. The extended distribution cabinet as claimed in claim 9, wherein the attachment element is in the form of an L with a short limb, which extends across two adjacent vertical profile struts of the first and second inner bodies and is screwed thereto.

14. The distribution cabinet as claimed in claim 9, wherein the attachment element is fixed to both of the inner bodies.

15. The extended distribution cabinet as claimed in claim 1, wherein the second inner body is supported by an additional base.

16. The extended distribution cabinet as claimed in claim 1, wherein side faces of the first and second inner bodies which point towards one another are not paneled with shielding plates, so that a continuous interior of the extended distribution cabinet is provided in a transverse direction of the extended distribution cabinet.

17. The extended distribution cabinet as claimed in claim 1, wherein each inner body includes a lower body frame and an upper body frame, and wherein the attachment element extends over an entire height of the upper body frame.

18. The extended distribution cabinet as claimed in claim 1, further comprising a modular roof including at least one of the following group of modular parts: longitudinal modules, connecting modules, and end modules.

19. The extended distribution cabinet as claimed in claim 18, wherein the roof includes a roof basic body with a peripheral, vertical edge and a cover emplaced thereon, the cover being assembled in modular fashion from a plurality of longitudinal modules, at least one connecting module, and a plurality of end modules.

20. The extended distribution cabinet as claimed in claim 19, wherein the roof basic body is designed to be continuous beyond any joints in the outer body.

21. The extended distribution cabinet as claimed in claim 19, wherein the connecting module is positioned between two longitudinal modules and a portion of the connecting module overlaps portions of the longitudinal modules, and wherein the connecting module includes a portion that engages or latches behind the two longitudinal modules in an interlocking manner to inhibit removal of the connecting module from the longitudinal modules.

22. The extended distribution cabinet as claimed in claim 19, wherein the end modules of the roof are connected to the body frame from an interior of the body frame, and wherein removal of the end modules from the body frame without releasing the end modules from the interior of the body frame is inhibited.

23. The extended distribution cabinet as claimed in claim 19, wherein widths of the longitudinal modules are matched to a width of the door of the outer body.

24. A construction kit for distribution cabinets, comprising:
    a plurality of horizontal struts having various lengths, the length of at least a first of the horizontal struts corresponding to one of a plurality of standard widths of inner bodies and the length of at least a second of the horizontal struts corresponding to one of a plurality of standard widths of enhanced inner bodies,
    a plurality of doors having various widths matching the standard widths of the inner bodies and the standard widths of the enhanced inner bodies,
    a plurality of modular roof components including a plurality of longitudinal modules, end modules, and connecting modules, the longitudinal modules having various lengths,
    a plurality of rear walls having various widths corresponding to standard widths of separate distribution cabinets.

25. The construction kit as claimed in claim 24, further comprising a plurality of attachment elements, each attachment element including a plurality of attachment members.

26. The construction kit as claimed in claim 24, wherein the longitudinal modules are matched to the widths of the doors, the widths of the inner bodies, or the widths of the enhanced inner bodies.

27. The construction kit as claimed in claim 24, wherein the construction kit further comprises roof basic bodies of various lengths.

28. A method for extending a distribution cabinet, comprising:
    providing a first inner body of the distribution cabinet with a first outer body mounted in spaced relation to the first inner body, the components of the first outer body being configured to attach to each other;
    removing components of the first outer body from the first inner body, the components of the first outer body including lateral paneling, a rear wall, and a door, the first inner body including a first mounting rack equipped with internal components;
    fixing a second inner body directly or indirectly to the first inner body to form a body frame;
    fixing a second mounting rack to the second inner body and equipping the second mounting rack with additional internal components;
    electrically connecting the additional internal components of the second inner body to the internal components of the first inner body and activating the additional internal components; and
    replacing the components of the first outer body on the body frame and adding additional outer body components to the body frame to form an extended outer body that is mounted in spaced relation to the body frame.

29. The method as claimed in claim 28, further comprising fixing at least one attachment element to at least one of the first inner body and the second inner body, wherein at least one component of the second outer body attaches to the attachment element.

30. The method as claimed in claim 29, wherein fixing the second inner body to the first inner body comprises fixing the second inner body directly to the first inner body; and wherein fixing the attachment element comprises fixing the attachment element to both of the inner bodies.

31. The method as claimed in claim 28, further comprising positioning a further base alongside an existing base prior to fixing the second inner body to the first inner body.

32. The method as claimed in claim 28, wherein fixing the second inner body to the first inner body comprises fixing the second inner body indirectly to the first inner body so that a gap extends between the first and second inner bodies, and wherein fixing the attachment element comprises positioning the attachment element in the gap between the inner bodies and connecting the attachment element to holders located on the inner bodies.

33. The method as claimed in claim 28, further comprising extending an existing roof of the distribution cabinet by adding additional modular components to existing modular components, the additional and existing modular components cooperating to form a new cover, wherein the modular components include longitudinal modules and at least one intermediate module and two end modules.

34. The method as claimed in claim 33, wherein the existing roof is extended by:

removing an end module of the existing roof from a first longitudinal module of the existing roof,     positioning a further longitudinal module adjacent the first longitudinal module,     connecting the further longitudinal module to the first longitudinal module of the existing roof with a connecting module,     emplacing the end module to the further longitudinal module opposite from the first longitudinal module to form a new cover, and     fixing the new cover to the distribution cabinet.

35. The method as claimed in claim 28, wherein fixing the new cover to the distribution cabinet includes screwing the new cover to the distribution cabinet from an interior of the distribution cabinet.

* * * * *